R. THRELFALL.
ELECTROLYTIC CELL.
APPLICATION FILED FEB. 27, 1912.

1,062,058.

Patented May 20, 1913.
2 SHEETS—SHEET 1.

WITNESSES.
L. Hoskinson
C. S. Brown

INVENTOR
Richard Threlfall
by John Freeman Watson & Coit
Attys.

R. THRELFALL.
ELECTROLYTIC CELL.
APPLICATION FILED FEB. 27, 1912.
1,062,058.
Patented May 20, 1913.
2 SHEETS—SHEET 2.
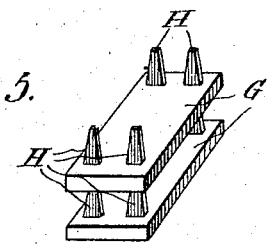
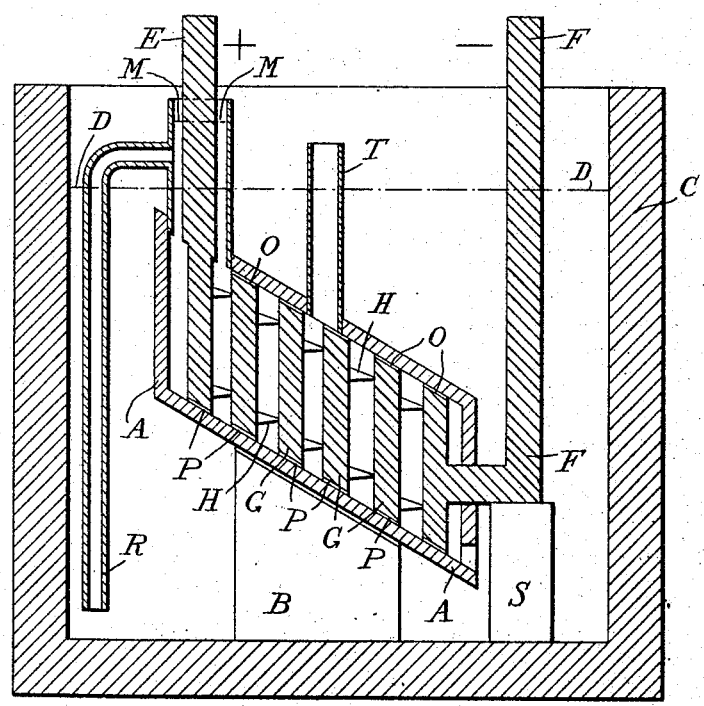
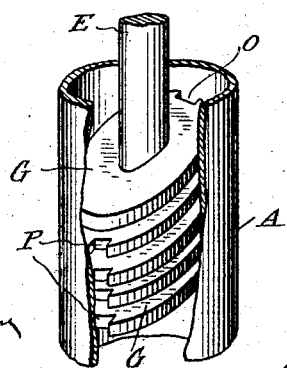
WITNESSES.
INVENTOR
Richard Threlfall

UNITED STATES PATENT OFFICE.

RICHARD THRELFALL, OF BIRMINGHAM, ENGLAND.

ELECTROLYTIC CELL.

1,062,058.  Specification of Letters Patent.  Patented May 20, 1913.

Application filed February 27, 1912. Serial No. 680,280.

*To all whom it may concern:*

Be it known that I, RICHARD THRELFALL, a subject of His Majesty the King of Great Britain and Ireland, residing at Birmingham, England, have invented new and useful Improvements in and Connected with Electrolytic Cells, of which the following is a specification.

One of the difficulties in the way of the more general application of electrolytic methods to chemical processes arises from the usually large size of electrolytic apparatus in relation to the output—one consequence of which is high supervision and repair charges. In order to secure greater compactness in the apparatus it is sometimes advantageous to submit to some loss of electrochemical and energy efficiency.

It has been proposed to form a comparatively compact apparatus intended to be so constructed as to prevent the current passing through the liquid around the electrodes thereby compelling the current to pass through the liquid directly between the electrodes and to secure these ends it has been proposed that the apparatus shall consist of an inner vessel supported in an outer one, the bottom of the inner one having openings through which the electrolyte may enter from the outer vessel and pass up between vertical electrodes carried by non-conducting plates let into grooves in the inner vessel and thence through horizontal openings and pipes from the inner to the outer vessel so as to secure circulation of the electrolyte, the eventual electrodes being at the ends of the inner vessel and being separated by the intermediate electrodes carried by the non-conducting plates above mentioned.

The present invention relates to apparatus of this general class and has for its object the construction of an effective electrolytic cell in which there shall be a minimum of electric leakage coupled with efficiency and ease of construction and repair other details being hereinafter set out.

Figure 1:
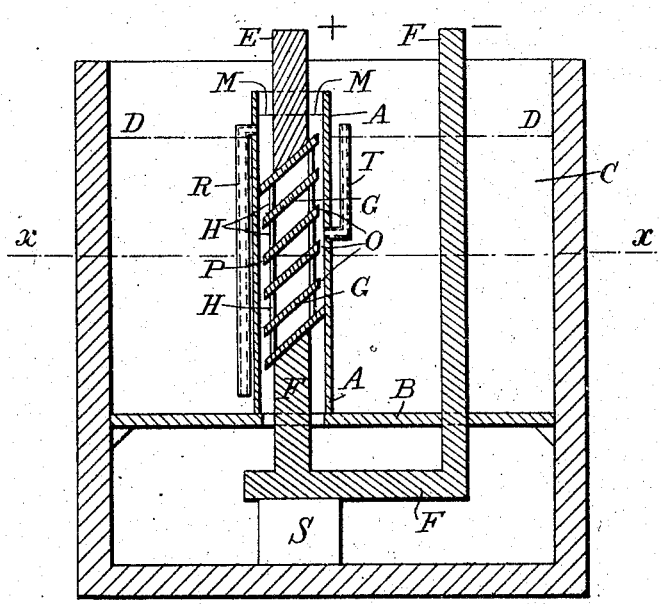
Figure 2:
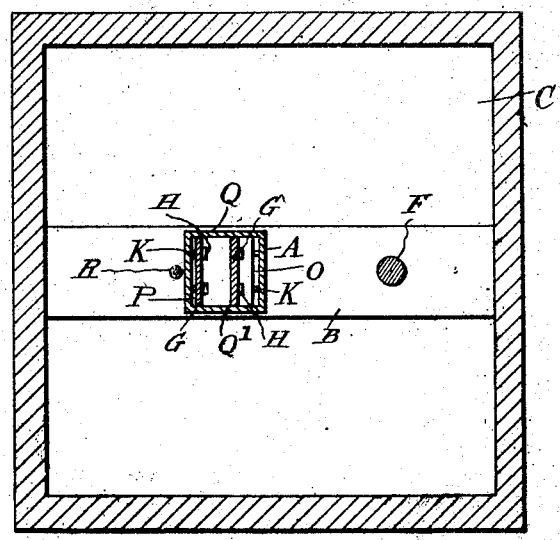

In the accompanying drawings:—Figure 1 is a vertical section, Fig. 2 a horizontal section on the line X—X, Fig. 3 illustrates a modification of the apparatus, Fig. 4 is a perspective view showing that if the inner vessel be round the electrodes necessarily become elliptical in order that they may extend across such tube or vessel at the requisite angle; and Fig. 5 is a perspective view of two rectangular electrodes with the wedges shown on a larger scale than in Fig. 1.

In said drawings:—C is a cell or tank containing the electrolyte.

A is a tube which in Figs. 1 and 2 may be round but which is shown as of rectangular cross section. This tube is non-conducting and should be of a material that will be unacted upon by the electrolyte. It may either be made in one piece or built up of several pieces, and is shown as being supported by a cross bar B.

E and F are the end electrodes of conducting material as little acted upon by the electrolyte as possible or insulated from the electrolyte if desired.

G. G. are intermediate electrodes placed obliquely or at an angle of less than 90 degrees from the vertical—for illustration four are shown.

H. H. are non-conducting distance pieces serving to keep the electrodes apart.

O. O. P. P. are gaps left between the intermediate electrodes and the inner walls of the tube A. The gaps P. P. allow the fluid electrolyte to enter the electrode spaces: the gaps O. O. allow the electrolyte to circulate upward as it becomes heated and provide for the escape of any gas produced during the electrolysis.

R is a tube which allows the liquor to return to the tank from the tube A: it is made of non-conducting material unacted upon by the electrolyte. Its object is to allow the electrolyte to return to the tank and still oppose some electrical resistance in the short circuit through the electrolyte from electrode E to electrode F. By rise of temperature generally assisted by disengagement of gas the liquor stands at a higher level in the tube A than in the tank.

B is a support for the tube A which may be arranged in any convenient manner so as to allow of free communication between the liquid in the tank and in the tube.

S is a support which may generally be of small dimensions or in some cases may be omitted—carrying the electrode F.

K. K. shown in the plan only—are strips of material attached to the wall of the tube A or projections from the side of the tube against which the electrodes rest. They may be made of the same material as the tube or of insulating material unacted upon by the liquor if not forming part of the tube itself.

D. D. is the level of the electrolyte in the tank.

M. M. is the level of the electrolyte in the tube—in general above D. D. when current is passing as already mentioned.

T is a tube providing an additional exit for gas and liquor—several such tubes may be arranged at different points along the tube A if the gas evolution in relation to the gaps at O is excessive, if it is not the tube T may be omitted.

In operation the action would be as follows:—assuming for the purpose of explanation that gas is formed during the electrolysis and a liquid product not miscible with the electrolyte is formed at one set of electrode surfaces which will for the purpose of explanation be taken as the negative electrode surfaces. Positive current entering at E distributes itself over the oblique foot and then flows across the electrolyte to the first intermediate electrode and so on in the well-known manner producing electrolysis in each gap till it reaches the bottom electrode F and so returns to the generator. The bottom electrode fits the tube at the higher side but a gap is left between the electrode and the inner wall of the tube at the lower side. The electrolyte enters the electrolytic column through this gap and as there are corresponding gaps right up to the foot of electrode E it can distribute itself to all the spaces between the intermediate electrodes. All electrodes make as close contact as is convenient with the walls of the tube at Q and Q'. The gas if any is produced together with the heating of the electrolyte causes an upward flow between the obliquely placed intermediate electrodes. The gaps between the ends of the electrodes and the sides of the tube A permit the liquor and gas to rise and escape into the free part of the tube above the foot of the main anode where the gas is separated from the electrolyte which flows back into the tank—one or more tubes R being placed in any desired position so as to bring about any degree of circulation desired—for instance they or it may be led to the bottom of the tank. If a non-miscible liquid is deposited on the cathode surfaces which are in each case the upper surfaces of the intermediate electrodes—this liquid runs down the inclined electrodes and drops through the gap left along the lower edges whence it reaches the tank where it may accumulate and be removed from time to time as desired.

One or more electrolytic columns as described may be placed in each tank, and may be worked electrically in parallel connection.

If a circular section be more convenient than a rectangular one for the tube A— the inclined electrode surfaces become elliptical and in this case the gaps P and O are more conveniently provided by cutting channels through the electrodes than by means of pieces as shown at K see Fig. 4.

The distance pieces H which are preferably cemented or let in to the upper face of each intermediate electrode are shown as having the same section throughout but in the case which usually occurs where the anode surfaces are more acted upon than the cathode surfaces the distance pieces take the form of spikes or wedges—the points of which rest against the anode surfaces. As wear takes place over the anode surface the electrodes descend and the distance of the gaps thus remains constant. Unless the distance pieces are of small cross-section where they abut against the anode surfaces they screen the part of the anode surface resting upon them to such an extent that it does not share the general wearing away and consequently the electrolytic gaps widen. If however, the distance pieces are sufficiently tapered the protection is not sufficient to prevent the electrodes dropping as required and keeping the electrolytic gaps very nearly constant in length parallel to the lines of flow of the current through them.

Fig. 3 shows a modification in which the intermediate electrodes G are practically vertical and in this construction the containing tube or vessel A is set at an angle so as to permit the gas to escape and to insure circulation of the electrolyte but with this construction the electrodes do not by their own weight maintain with certainty a practically even electrolytic gap as they wear away. With this construction the current entering by E passes through the electrolyte between it and the first intermediate electrode G and so on in the well known manner producing electrolysis in each gap until it reaches the bottom electrode F and so returns to the generator. The electrodes E, G, and F are separated by wedges or spikes H and openings or spaces O, P, are left between the top and bottom of electrodes G and the walls of the nonconducting vessel A to enable the electrolyte to circulate and the gases generated to pass up and escape through T and at M respectively while the electrolyte can return to the outer vessel C through pipe R while fresh electrolyte enters A at its lowest point as in Fig. 1. The electrodes will generally be of graphite but when the electrolyte is of such a nature as not to injuriously affect or be affected by their use such electrodes may be of hard carbon, oxid of iron or other known conducting material. The construction is not quite so effective as with the apparatus shown in Figs. 1 and 2, although the circulation of the electrolyte and the prevention of short circuiting is equally well secured, but the escape of gas and the maintenance of even electrolytic gaps are more difficult to secure.

What is claimed is:—

1. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate.

2. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, and means separating and supporting the intermediate electrodes by which the electrolytic gaps are automatically maintained practically constant in length parallel to the lines of flow of the current irrespective of wear or chemical action on their surfaces.

3. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, a pipe of non-conducting material connecting the inner vessel at a point normally above the level of the electrolyte in the outer vessel with such outer vessel at a point practically lower than the lowest electrode therein.

4. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, a gas discharge pipe from the inner vessel terminating at a point above the level of the electrolyte.

5. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, and means separating and supporting the intermediate electrodes by which the electrolytic gaps are automatically maintained practically constant in length parallel to the lines of flow of the current irrespective of wear or chemical action on their surfaces, a pipe of non-conducting material connecting the inner vessel at a point normally above the level of the electrolyte in the outer vessel with such outer vessel at a point practically lower than the lowest electrode therein.

6. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, and means separating and supporting the intermediate electrodes by which the electrolytic gaps are automatically maintained practically constant in length parallel to the lines of flow of the current irrespective of wear or chemical action on their surfaces, a gas discharge pipe from the inner vessel terminating at a point above the level of the electrolyte.

7. An electrolytic apparatus consisting of a receptacle for the electrolyte, a non-conducting inner tube or vessel therein and opening thereinto, eventual main electrodes in the inner vessel, a plurality of intermediate electrodes between the eventual electrodes at an angle to the walls of the vessel and so arranged as to provide ducts or passages by which the gases and liquid products of the electrolysis can escape and the electrolyte circulate, a pipe of non-conducting material connecting the inner vessel at a point normally above the level of the electrolyte in the outer vessel with such outer vessel at a point practically lower than the lowest electrode therein, a gas discharge pipe from the inner vessel terminating at a point above the level of the electrolyte.

In witness whereof I have hereunto set my hand in the presence of two subscribing witnesses.

RICHARD THRELFALL.

Witnesses:
SAML. B. ROUND,
CHAS. H. T. BUTLER.

Copies of this patent may be obtained for five cents each, by addressing the "Commissioner of Patents, Washington, D. C."